May 9, 1933. S. E. SHEPPARD ET AL 1,908,546
PROCESS FOR THE CONDITIONING OF CELLULOSE DERIVATIVE FILMS
Filed Oct. 22, 1929
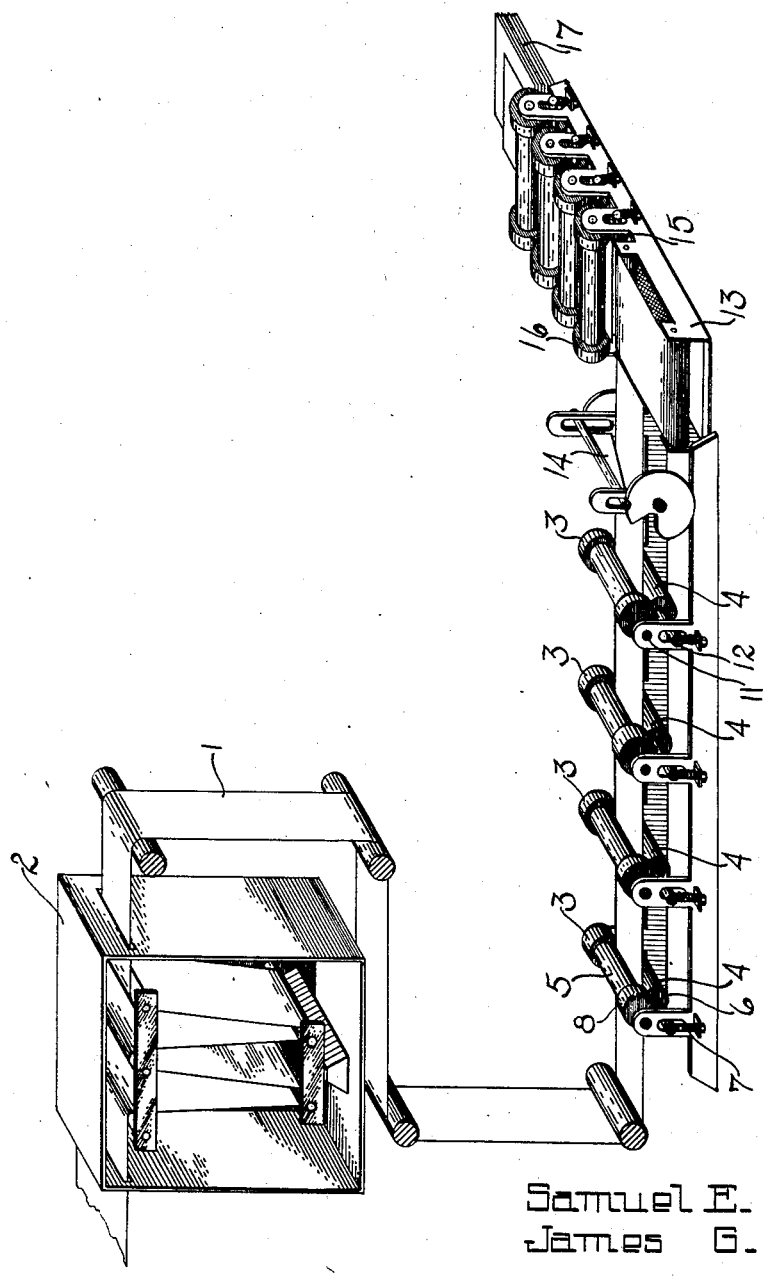
Samuel E. Sheppard
James G. McNally
Inventors Patented May 9, 1933

1,908,546

UNITED STATES PATENT OFFICE

SAMUEL E. SHEPPARD AND JAMES G. McNALLY, OF ROCHESTER, NEW YORK, ASSIGNORS TO EASTMAN KODAK COMPANY, OF ROCHESTER, NEW YORK, A CORPORATION OF NEW YORK

PROCESS FOR THE CONDITIONING OF CELLULOSE DERIVATIVE FILMS

Application filed October 22, 1929. Serial No. 401,582.

This invention relates to a process for the conditioning of organophile cellulose derivative films particularly for use in the photographic and like industries utilizing sheet films.

In investigations of the density, the vapor absorbing power, the permeability and the swelling of cellulose ester and other like film supports due to water absorption and other causes, as prepared by coating or casting from solutions and evaporation therefrom the volatile solvent or solvents, have shown that the supports have structure and porosity, although the elements of this structure and the pore-spaces are usually of submicroscopic dimensions. Further evidence for such structure has been obtained by optical examination of the birefringence which has disclosed the existence of micellar or supermolecular units whose arrangement, as regards disposition of axes is capable of being altered by mechanical workings, such as stretching, shearing, compression and combinations of tensions and thrusts parallel to three mutually perpendicular axes in space.

Further, when such a cellulose ester, ether, or other derivative, soluble in organic solvents is evaporated down from a solution also containing certain organic non-solvents (for the cellulose ester), a visually homogeneous transparent mass is obtained which is, however, submicroscopically heterogeneous or two-phase, the certain non-volatile non-solvent frequently termed a softener or plasticizer occupying the micro-pore space between the cellulose ester elements. Such non-solvent plastifier may, however, possess a certain measure of solvent power when joined in the presence of direct solvents, or even of other non-solvents per se. Furthermore, they may show solvent power at higher temperatures. Such bodies are said to possess "latent solvent power".

The presence of certain amounts of these substances in a coated or cast skin of cellulose ester, ether, or other organophile cellulose derivative not only gives valuable properties per se, but also has potential value in respect of the mechanical work aforementioned of the support.

An object of the present invention is to provide a process for so treating these organophile cellulose derivative materials in order to render them more resistant to absorption and swell while also increasing their tensile strength. Other objects hereinafter appear.

We have found that the structure of film supports, skins or sheets of organophile cellulosic derivatives, may be notably improved, in respect of dimensional water absorption, dimensional permeability, greater density and increased tensile strength, by the joint application of heat and mechanical work (pressure or shear) to skins, sheets or films which have had only but small amounts (5% or less) of volatile solvent.

The temperatures which may be employed depend upon the softening or melting point of the particular cellulose derivative employed, the mixture of the cellulose derivative and plasticizer, as well as on the stability (tendency to mechanical decomposition), but will in general be temperatures readily attained by steam at various pressures. The temperatures, therefore, may vary from 120° F. to 570° F. The mechanical stresses applied, expressed in pounds per square inch, will also vary with the particular derivative used but for effective working will generally be equal to or greater than 100 pounds per square inch.

As has been stated, heretofore, it has been found desirable to have but small amounts say 5% or less of volatile solvent in the film prior to its conditioning. The film may contain also, a considerable amount of plasticizer, as 15% to 30% by weight of dibutyl phthalate, triacetin (containing about 10% of monacetin), coconut oil, monochlor napthaline, paratoluene-sulphonamide, paratoluene sulphonic acid or other plasticizer.

The proportion of these plasticizers present govern to a large extent the temperature of the softening of the resultant film.

The single figure in perspective is one form of apparatus in which our process may be conveniently carried out with various parts thereof exaggerated for clearness. By its use sheets of film having great length relative to width may be conditioned by our process in a continuous manner.

An efficient method of conducting our process consists in first submitting the film to suitable tension and then passing the film while still under tension through rolls which by means of heat and pressure reduce the tendency of the resultant film to stretch and swell and likewise increase its tensile strength. By reference to the accompanying drawing one manner of effecting this result is shown. The film 1 is put under suitable tension in a manner such as described in our copending application Serial No. 338,591, part of the apparatus therein shown being indicated in the attached drawing. This film may be tensioned in the apparatus 2 by the means shown, or in any other suitable manner. The film is drawn from the tensioning apparatus and passed between the series of rolls 3 and 4. Either or both of these calendering rolls may be heated to the temperature most suitable for the film which is being processed. The roll 3 is recessed at 5 in order to accurately fit the width of the film while roll 4 has a raised portion at 6 which exactly fits into the recessed roll 3. The amount of pressure between the two rolls may be regulated by the pressure screws 7 which may act on either cylinder but are herein shown as acting on the cylinders 4. While these cylinders may be differentially or uniformly driven they are here shown as being uniformly driven through any suitable gear train or other means not shown. The whole series of rolls being operated by means of a chain or other power transmitting means and a prime mover not shown.

While there are a series of rolls designated in this darwing it is evident that in some instances a single pair of rolls may render the film sufficiently resistant for the purposes at hand. The rolls may be mounted in any desired manner or on the framework 10 through the fixed bearings 11 and movable bearings 12.

The sheets may be used as conditioned by one passage through the rolls but if desired the sheets may be cut in suitable lengths and passed through a similar series of rolls at right angles to their first rolling, thereby rendering the sheets more resistant in both directions to swell and shrinkage. This is accomplished in the drawing by the sheets passing from the last pair of rolls of the first series to a suitable table 13 on which after they are cut by knife 14 are conveyed into the second series of rolls 15 and 16 similar to the first series, but set at an angle thereto. These rolls restrict the flow of the film at an angle to the flow in the first treatment thus inhibiting the swell and shrinkage of the film sheet in two directions. The finished condition film is delivered at 17. This same effect may likewise be accomplished by laminating two or more sheets as conditioned by one passage through the rolls, the maximum direction of swell between adjacent sheets being at an angle.

While the above type of apparatus is one method of conducting our process it will be understood that various changes in its design and in the type of organophile cellulose derivative film conditioned may be used without in any way departing from this invention or sacrificing any of the advantages that may be derived therefrom.

We claim:

1. A method for the conditioning of cellulose derivative films which comprises continuously subjecting film having great length relative to width, while under tension, to a pressure of at least 100 lbs. per square inch and a temperature just sufficient to render the film flowable, the flow of the film being restricted in one direction.

2. A method for the conditioning of cellulose derivative films which comprises continuously subjecting film having great length relative to width to a pressure of over 100 pounds per square inch and a temperature between 120° F. and 570°F., the flow of film being restricted in one direction whereby its tendency to swell and shrink is decreased and its tensile strength increased.

3. A method for the conditioning of cellulose derivative films which comprises continuously subjecting film having great length relative to width, while under tension, to a pressure of over 100 pounds per square inch and a temperature between 120° F. and 570° F. just sufficient to render the film flowable, the flow of the film being restricted in one direction.

4. A method for the conditioning of cellulose derivative films which comprises subjecting film having great length relative to width, while under tension, to a pressure of over 100 pounds per square inch and a temperature between 120° F. and 570° F. just sufficient to render the film flowable, the flow of the film being restricted in one direction and subsequently subdividing the film and subjecting it in subdivided form to a second increase in temperature and pressure, its flow being restricted at an angle to its restriction in its first conditioning treatment.

Signed at Rochester, New York this 18th day of October 1929.

SAMUEL E. SHEPPARD.
JAMES G. McNALLY.